United States Patent [19]
Hoff et al.

[11] Patent Number: 4,890,975
[45] Date of Patent: Jan. 2, 1990

[54] LOOP SPRING STACKING MACHINE

[75] Inventors: Jeffrey H. Hoff; Michael L. Kozak; Horst F. Wentzek, all of Kenosha, Wis.

[73] Assignee: Frank L. Wells Company, Kenosha, Wis.

[21] Appl. No.: 176,212

[22] Filed: Mar. 31, 1988

[51] Int. Cl.$^4$ .................. B65G 57/16; C21D 9/02
[52] U.S. Cl. .................. 414/788.9; 148/154; 148/155; 414/27; 414/790.9; 414/794.2; 414/923
[58] Field of Search .................. 140/89; 148/154, 155; 414/27, 31, 35, 51, 81, 82, 97, 788.2, 788.9, 790.9, 794.2, 923

[56] References Cited

U.S. PATENT DOCUMENTS

| | | | |
|---|---|---|---|
| 2,116,327 | 5/1938 | Simmons | 148/155 X |
| 2,173,077 | 9/1939 | Minkel | 414/27 X |
| 2,261,878 | 11/1941 | Hathaway | 148/154 X |
| 4,156,335 | 5/1979 | Strobl et al. | 414/31 X |
| 4,396,332 | 8/1983 | Schmidt et al. | 414/35 |

FOREIGN PATENT DOCUMENTS

| | | | |
|---|---|---|---|
| 51-60617 | 5/1976 | Japan | 148/154 |
| 59-38329 | 3/1984 | Japan | 148/154 |
| 8001943 | 10/1980 | Netherlands | 148/154 |

Primary Examiner—David A. Bucci
Assistant Examiner—Janice Krizek
Attorney, Agent, or Firm—Michael, Best & Friedrich

[57] ABSTRACT

Disclosed herein is apparatus for stacking loop springs which include a series of oppositely oriented U-shaped loops, which apparatus comprises a frame, a storage chamber on the frame for temporary and one-at-a-time storage of the springs, guide elements located on the frame below the spring storage chamber for guiding and supporting the springs into an aligned stack, and movable elements on the frame and operative independently of the guide elements for effecting spring discharge from the storage chamber and onto the guide elements.

22 Claims, 3 Drawing Sheets

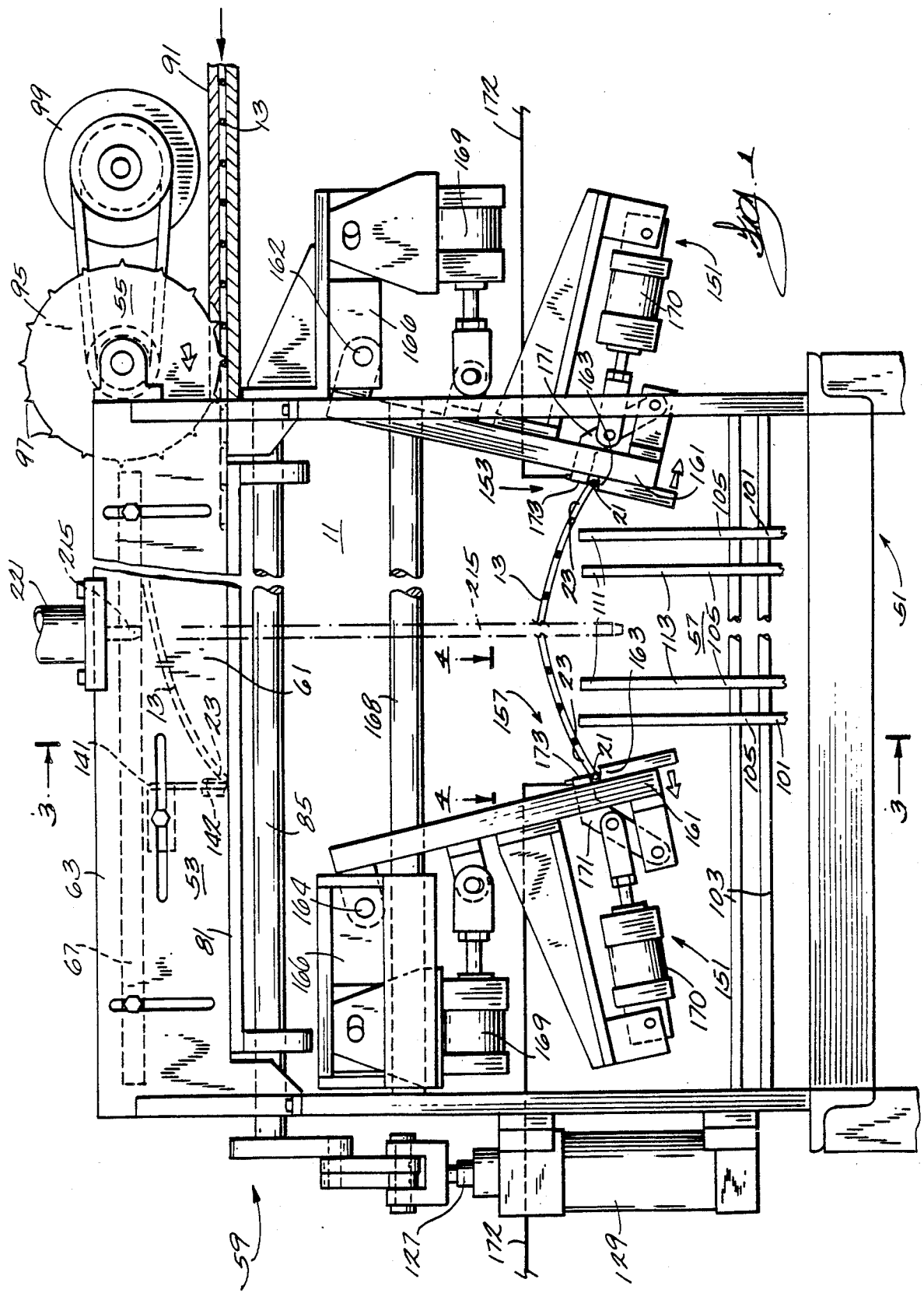

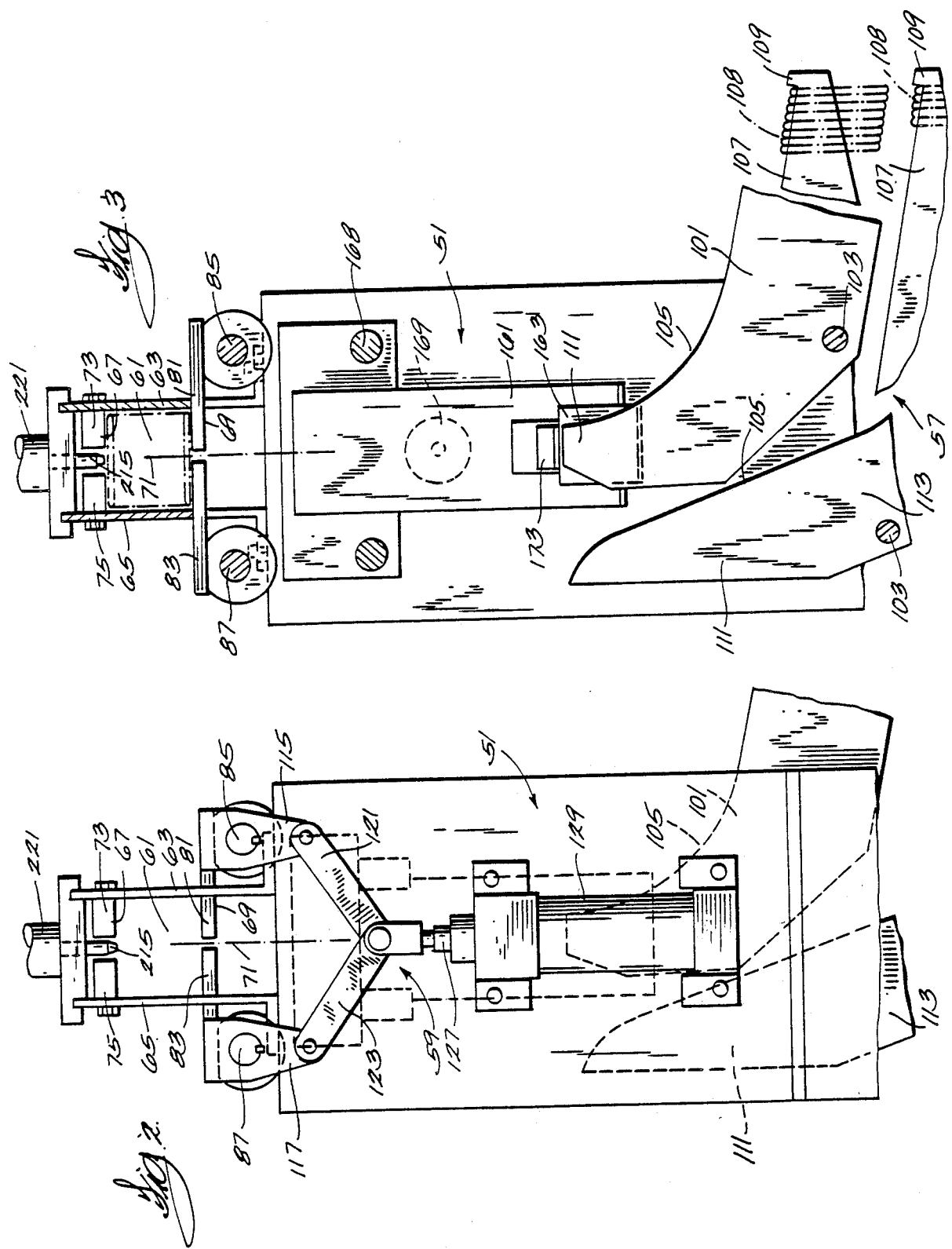

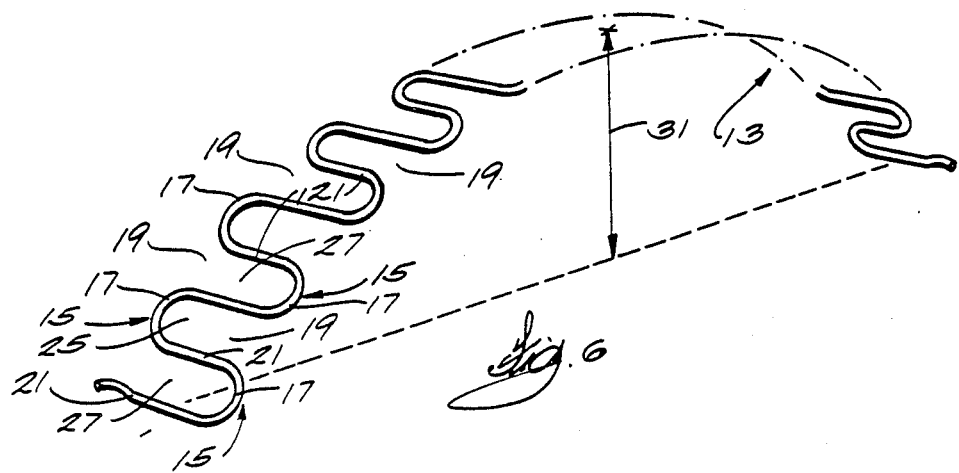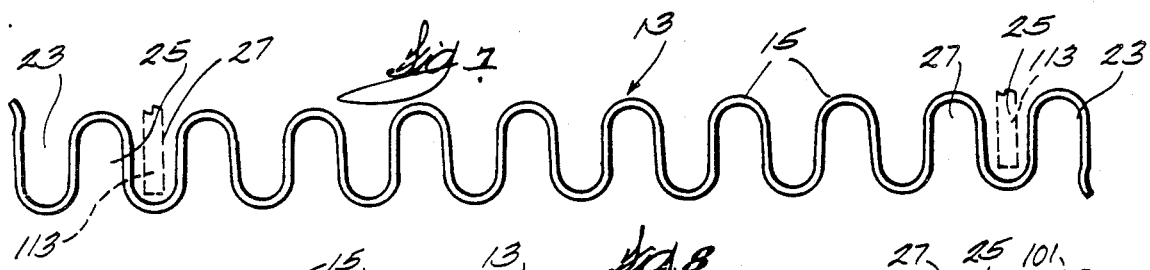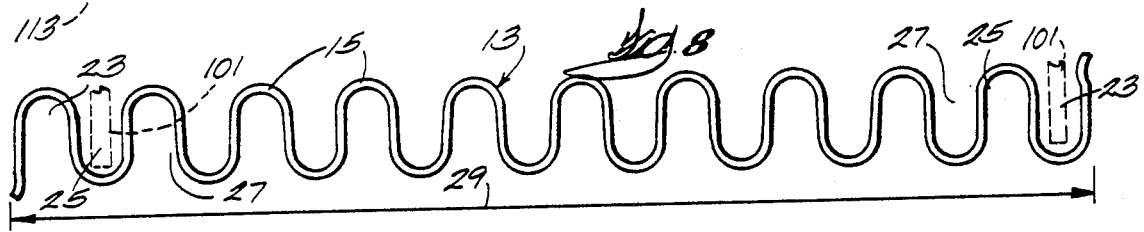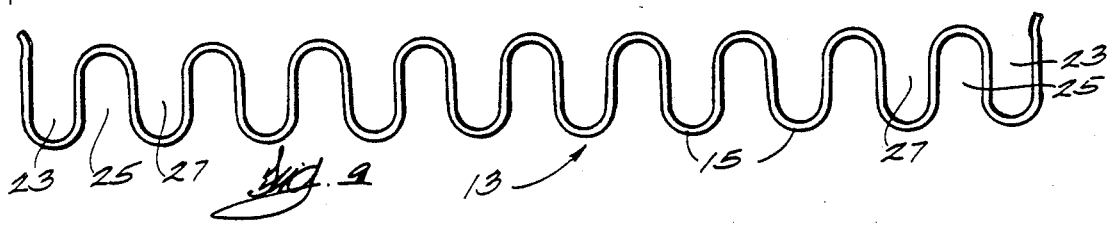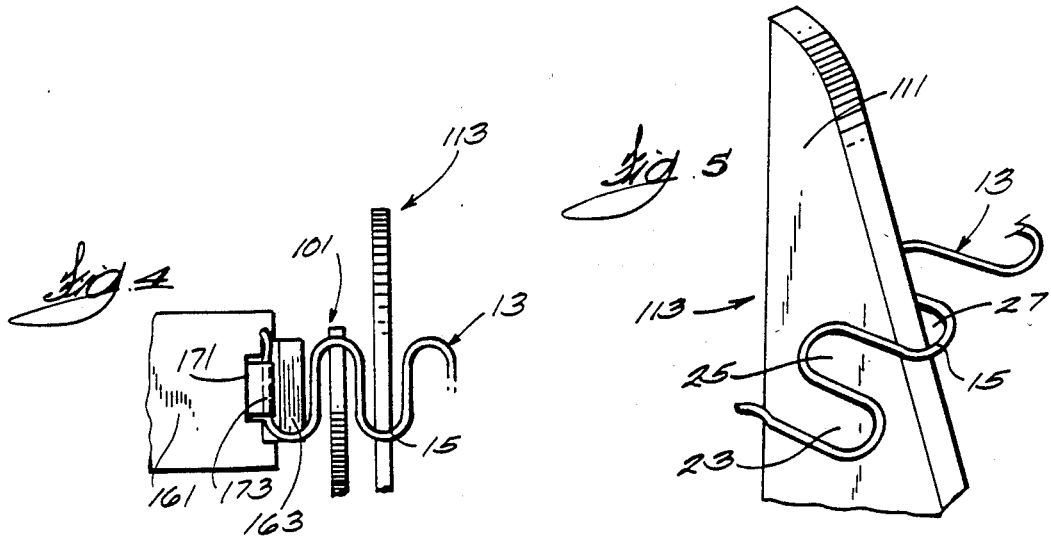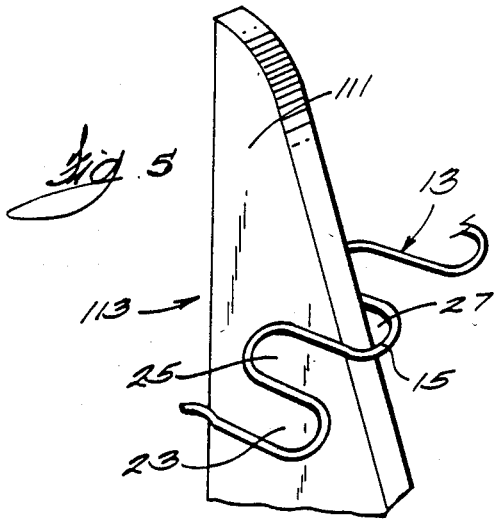

LOOP SPRING STACKING MACHINE

BACKGROUND OF THE INVENTION

The invention relates generally to apparatus for stacking loop springs in aligned stacks for shipment to customers who integrate such loop springs into seat cushions and other articles.

In one prior art construction, loop springs were fed from a spring fabricating machine in flat condition into a series of elongated recesses in a rotatable drum such that the springs were releasably and frictionally held along one lengthwise edge in a recess by spring action attempting to relax to an arced condition and such that a portion along the length of each of the springs extended from the drum recess. The drum was sequentially rotated relative to a pair of stacking blades including upper ends which, incident to drum rotation, were received between the drum and the closed ends of the extending spring loops, whereby the springs were withdrawn from the drum incident to drum rotation and so as thereby to afford stacking of the springs incident to downward spring travel on the stacking blades.

SUMMARY OF THE INVENTION

The invention provides an apparatus for stacking loop springs which include a series of oppositely oriented U-shaped loops, which apparatus comprises a frame, means on the frame for temporary and one-at-a-time storage of the springs, means on the frame below the spring storage means for guiding and supporting springs into an aligned stack, and means on the frame and operative independently of the guiding and supporting means for effecting spring discharge from the storage means and onto the guiding and supporting means.

The invention also provides an apparatus for stacking loop springs which include opposed ends and a series of oppositely oriented U-shaped loops having resPective closed bite portions which are oppositely open, which apparatus comprises a frame, an elongated storage chamber on the frame for temporary and one-at-a-time storage of the springs, which storage chamber includes stop means, and means for adjustably locating the stop means lengthwise of the storage chamber, which storage chamber also includes a bottom wall including a pair of segments which are movable away from each other to afford spring passage therebetween and from the storage chamber, a first pair of guide elements supported by said frame and extending vertically in spaced parallel relation to each other and having respective lower end portions extending in one horizontal direction from the storage means to support an aligned stack of springs, and upper end portions located below the storage chamber in position to intercept and engage the closed bite portions of a pair of spaced loops respectively located adjacent the spring ends, means on the frame and operative independently of the guiding and supporting means for effecting spring discharge from the storage means and onto the guiding and supporting means, and means on the frame for tempering the springs incident to spring passage from the storage means to the guiding and supporting means.

Other features and advantages of the invention will become known by reference to the following general description, the claims, and the appended drawings.

THE DRAWINGS

FIG. 1 is a partially broken away, elevated view of the front side of an apparatus for stacking loop springs.

FIG. 2 is an end elevational view which is taken from the left in FIG. 1 and which is partially broken away.

FIG. 3 is a sectional view taken along line 3—3 of FIG. 1.

FIG. 4 is a partial view taken along line 4—4 of FIG. 1.

FIG. 5 is a perspective view of the engagement of a loop spring with a guide element.

FIG. 6 is a perspective view of a loop spring which is shown in arced condition.

FIG. 7 is a plan view of the loop spring shown in FIG. 6 in flat condition.

FIG. 8 is a view similar to FIG. 7 showing a loop spring which is oppositely oriented with respect to the loop spring shown in FIG. 7.

FIG. 9 is a view similar to FIG. 7 and illustrating a loop spring having one less loop than the loop spring shown in FIG. 7.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Disclosed herein is an apparatus 11 (See FIG. 1) adapted to stack loop springs 13, one of which is shown in FIG. 6, which springs can be fabricated of steel, and which are serially received from a spring fabricating machine (not shown). Each of the loop springs 13 to be stacked includes a series of U-shaped loops 15 which are generally identical except for being alternately oriented, and which include a closed bite portion 17 and an open end 19 defined by a pair of spaced transverse portions 21 extending from the closed bite portion 17. More specifically, each loop spring 13 also includes spaced end loops 23, first adjacent loops 25 oppositely oriented from the adjacent end loops 23, and second adjacent end loops 27 oriented in the same direction as the adjacent end loops 23 and oppositely from the first adjacent end loops 25.

The loop springs 13 can include an even number of U-shaped loops 15, as shown in FIGS. 7 and 8, in which case, the end loops 23 in each spring 13 are oriented in the opposite direction and the incoming end loop 23 of each successive spring 13 entering the stacking apparatus 11 is oppositely oriented.

The springs 13 can also include an odd number of U-shaped loops, as shown in FIG. 9, in which case, the end loops 23 are oriented in the same direction and the incoming end loop 23 of each successive spring 13 entering the stacking apparatus 11 is in the same orientation.

As will be seen hereinafter, the stacking apparatus 11 is adapted to receive and stack successive springs 13 which are fed to the apparatus with each entering end loop 23 in the same, or in alternating, orientations. In addition, the stacking apparatus 11 is adapted to receive and stack springs 13 of different lengths 29 (see FIG. 8), i.e., springs having a differing number of loops and/or different distances between the transverse portions 21, springs 13 which, when relaxed, have arcs of differing heights 31 (see FIG. 6), and springs 13 having loops 15 of different transverse dimensions, i.e., differing dimensions between the closed bite portions 17 and the open ends 19.

The disclosed stacking apparatus 11 includes a frame 51 which can be of any suitable construction. Also included in the stacking apparatus 11 is means 53 for temporary and one-at-a-time storage of incoming springs to be stacked, and means 55 for feeding the incoming springs to the storage means 53.

In addition, the stacking apparatus 11 includes means 57 carried by the frame 51 below the storage means 53 for guiding and supporting the springs 13 into an aligned stack, and means 59 on the frame 51 and operative independently of the guiding and supporting means 57 for discharging the springs 13 from the storage means 53 and onto the guiding and supporting means 57.

More particularly, the storage means 53 is supported by the frame 51 and comprises an elongated storage chamber 61 (see FIGS. 2 and 3) formed by opposed front and rear side walls 63 and 65, by an upper top wall 67, and by a bottom wall or floor 69. The side walls 63 and 65 are suitably mounted on the frame 51 for adjustment relative to a center line 71 to accommodate springs 13 with loops 15 of differing transverse dimensions. The top wall 67 includes spaced front and rear segments 73 and 75 which are respectively and suitably mounted on the front and rear side walls 63 and 65 for adjustment relative to the bottom wall 69 to accommodate springs 13 which, when relaxed, have differing heights 31.

The bottom wall 69 includes a pair of elongated front and rear segments 81 and 83 which are located on opposite sides of the center line 71 and which are mounted for movement, from a horizontal spring supporting position (see FIGS. 2 and 3), in opposite directions to afford spring discharge between the bottom wall segments 81 and 83 in response to movement of the wall segments 81 and 83 away from each other. While various other arrangements can be employed, in the illustrated construction, the wall segments 81 and 83 extend respectively from spaced parallel rock shafts 85 and 87 which are suitably journaled by the frame 51 and which are rotated in opposite directions to displace the wall segments 81 and 83 from a horizontal spring supporting position to vertical positions affording downward discharge of springs 13 from the storage chamber 61.

The means 55 for feeding springs to the storage chamber 61 can take various forms and, in the disclosed construction, comprises (see FIG. 1) a four sided track or path 91 which can be of any suitable construction, which is at least partially supported by the frame 51, and into which the springs 13 are inserted in flat form from a spring fabricating machine (not shown).

The feeding means 55 also includes a feeding wheel 95 including a plurality of angularly spaced teeth 97 which are angularly spaced so as to engage the transverse portions 21 of the loops 15. The feeding wheel 95 is rotatably driven by any suitable means, such as the illustrated motor 99, to rapidly advance the springs 13 into the storage chamber 61 and to thereby clear the path 91 for receipt of additional springs 13 from the spring fabricating machine (not shown).

The spring guiding and supporting means 57 can take various forms and, in the disclosed construction, comprises a pair of spaced stacking blades or guide elements 101 which are adapted to receive discharged springs 13 from the storage chamber 61 and to convey the discharged springs into aligned stacks.

The stacking blades or guide elements 101 are supported on transverse bars or rods 103 which form a part of the frame 51 and which extend parallel to the center line 71 of the storage chamber 61. The guide elements 101 are adjustably located lengthwise on the bars 103 to accommodate springs 13 of differing lengths 29, i.e., springs 13 having different numbers of loops 15, or springs 13 having loops 15 with differing dimensions between the transverse portions 21.

The guide elements 101 are located in spaced parallel relation to each other, extend generally vertically, and include guide and support edges 105 which extend vertically and horizontally and preferably in a smooth arc. More particularly, the guide and support edges 105 include lower portions 107 which are provided with a stop 109 to limit downward spring travel, and which extend both horizontally and vertically so that the springs 13 supported thereby form an aligned stack 108. The guide elements 101 also include upper end portions 111 which extend vertically and horizontally from below the storage chamber 61 and from slightly forwardly of the center line 71 of the storage chamber 61. The guide elements 101 are adjustably located on the rods 103 in positions so that the edges 105 intercept and engage, at each end of the spring 13, the closed bite portions 17 of one of the first or second adjacent end loops 25 and 27 which are open in the direction away from the guide elements 101, i.e., in the direction toward the rear of the apparatus 11.

While a single pair of guide elements 101 are sufficient to stack springs 13 which are identically fabricated, i.e., having loops 15 in identical arrangement, when springs with oppositely oriented end loops are fed to the apparatus, a second pair of guide elements is provided so as to facilitate separate stacking in a first stack of springs of one configuration and in a second stack of springs of the other configuration. Thus, in the disclosed construction, the guiding and supporting means 57 also comprises a second pair of stacking blades or guiding elements 113 which are located below the storage chamber 61, which are adjustably supported by the rods 103, and which include support edges 105, and lower end portions 107 which include a stop 109 and which extend below the lower end portions 107 of the first pair of guide elements 101 so that the stack of springs 108 (with the loops in one orientation) on the guide elements 101 is located generally above a second stack 108 of springs (with the loops in the opposite orientation) on the guide elements 113.

The guide elements 113 also include upper end portions 111 which extend vertically and horizontally from below the storage chamber 61 and from a position somewhat rearwardly of the center line 71 of the storage chamber 61.

The second pair of guide elements 113 are adjustably located so as to intercept and engage, at each end of the spring 13, the blind or closed bite portions 17 of the other of the first and second adjacent end loops 25 and 27 of the springs 13 having opposite orientation. It is noted, that each of the pairs of guide elements 101 and 113 does not interfere with stacking of the springs of one loop orientation because the open ends of the loops face the other pair of guide elements and vice versa.

The means 59 for discharging the springs from the storage chamber for interception by the guide elements 101 and 113 can take various forms and, in the disclosed construction, comprises means for oppositely rotating the bottom wall segments 81 and 83 to facilitate discharge by gravity of the springs 13 from the storage chamber 61 and interception by the stacking blades or guide elements 101 and 113. While other constructions can be employed, in the illustrated construction, the means for oppositely rotating the bottom wall or floor segments 81 and 83 comprises (see especially FIG. 2) means for oppositely rotating the rock shafts 85 and 87. While various means can be employed, in the disclosed construction, such means comprises, on the rock shafts 85 and 87, respectively fixed levers 115 and 117 which, when the bottom wall 69 is closed, extend downwardly, and which ar respectively pivotally connected to links 121 and 123 which, in turn, are pivotally connected to one end of a plunger 127 extending into a vertically oriented solenoid coil 129. Thus, actuation of the solenoid coil 129 causes vertical movement of the plunger 127, which movement causes opposite rotation of the rock shafts 85 and 87 to open the bottom of the storage chamber 61. Preferably, the plunger 127 is biased downwardly by a spring (not shown) so as to normally locate the bottom wall segments 81 and 83 in horizontal position.

Also provided in the storage chamber 61 (see FIG. 1) is a stop 141 which is adjustable lengthwise of the storage chamber 61 and which can be directly supported by the frame 51 but which, in the disclosed construction, is adjustably supported by one of the side walls 63 and 65 and which is adapted to be engaged by the incoming end loop 23 of the incoming spring 13 to halt incoming spring movement and to locate the incoming spring 13 in proper position within the storage chamber 61. Carried by the stop 141 is an electrical sensor 142 which is engaged by the incoming spring to signal location of the incoming spring 13 in the storage chamber 61.

Suitable electrical controls (not shown), believed to be well known in the art, can be employed, in cooperation with the sensor 142, to energize the solenoid coil 129 upon engagement of the stop 141 to locate the bottom wall segments 81 and 83 in the vertical condition and, after a time delay, to deenergize the solenoid coil 129, thereby permitting the spring 131 to relocate the bottom wall segments 81 and 83 in horizontal condition after discharge of a spring 13. The feeding wheel 95 is then actuated to feed another spring 13 from the supply track or path 91 into the storage chamber 61.

The apparatus 10 also includes a guide rod 215 which, in an extended position described below, extends vertically from the floor 69 of the storage chamber 61 to below the upper ends 111 of the stacking blades or guide elements 101 and 113 and in position to engage a spring 13 descending from the storage chamber 61 to the stacking blades 101 and 113 so as to guide the descending spring 13 onto the stacking blades 101 and 113 in the event the decending spring 13 does not otherwise smoothly fall from the storage chamber 61 onto the stacking blades 101 and 113.

The guide rod 215 is a thin rod and is preferably displaceable between a retracted position with the bottom of the rod 215 above the top of the storage chamber 61 so as to prevent interference with spring feeding to the storage chamber 61, and an extended position (shown in dotted lines in FIG. 1) in which the guide rod 215 extends vertically through the storage chamber 61, through a slot in the bottom or floor 69 of the storage chamber between the bottom wall segments 81 and 83, and to adjacent the upper ends 105 of the stacking blades 101 and 113.

The guide rod 215 is supported and is displaced between its retracted and extended positions by a solenoid or by a pneumatic cylinder 221 which is mounted on the top wall 67 of the storage chamber by means permitting adjustable location of the guide rod 215 lengthwise of the storage chamber 61 so that the guide rod 215 can be centrally located lengthwise of the springs 13 being stacked. Preferably, the guide rod 215 is positioned to extend through a loop 15 which is open toward the rear of the storage chamber 61 so that the guide rod 215 does not interfere with travel of the springs 13 onto the appropriate pair of the stacking blades 101 and 113.

Any suitable control arrangement can be employed to extend the guide rod 215 after feeding of a spring 13 to the storage chamber 61 and prior to opening of the floor or bottom wall 69 of the storage chamber 61 and to retract the guide rod 215 after engagement of the descending spring 13 with the stacking blades 101 and 113 and prior to feeding of another spring 13 into the storage chamber 61.

If desired, the apparatus 11 can also include (see FIG. 1) means 151 for tempering the springs 13 after discharge thereof from the storage chamber 61 and prior to interception by the stacking blades or guide elements 101 and 113. While other constructions can be employed, in the disclosed construction, such tempering means 151 includes a pair of spaced clamps 153 and 157 mounted on the frame 51 for movement between a first or extended position (shown in full lines in FIG. 1) extending into the path of movement of the end loops 23 of a discharged spring 13 and a retracted position clear of the path of the end loops 23 of the discharged spring 13. Any suitable means can be employed for displacing the clamps 153 and 157 between their extended and retracted positions. In the disclosed construction such means comprises a pneumatic cylinder 169 operatively connected between the clamps 153 or 157 and brackets 166 supported by the frame 51.

While other constructions can be employed, in the disclosed construction, the clamps 153 and 157 are generally identically constructed and each of the clamps 153 and 155 includes a first or main clamping element 161 which is pivotally mounted on one of the brackets 166. The bracket 166 associated with the clamp 153 is suitably fixed on the frame 51 and the bracket 166 associated with the clamp 157 is adjustably carried on a transverse rod 168 supported by the frame 51. Each of the clamps 153 and 157 includes a jaw 163 which is adapted to engage the transverse portion 21 of the adjacent end loop 23 upon discharge of the spring from the storage chamber 61.

Movably mounted on the main clamping element 161 is a second clamping element 171 which is movable relative to the main clamPing element 161, and which includes a jaw 173 engageable with the transverse portion 21 of the adjacent end loop 23 to clamp the adjacent end loop 23 between the jaws 163 and 173.

One of the jaws 163 and 173 of each clamp 153 and 157 is connected in an electrical circuit 172 (shown schematically) adapted to pass an electric current through the clamped spring 13 to heat the spring to a temperature sufficient to obtain the desired tempering. The jaws in the electrical circuit 172 are suitably electrically insulated from the remainder of the clamps 153 and 157.

Any suitable means can be employed to displace the second or movable clamping element 171 relative to the first clamping element 161. In the disclosed construction such means comprises a pneumatic cylinder 170 operative between the first clamping element 161 and the movable clamping element 171. In this regard, in operation, the clamps 153 and 157 are located in their extended positions when the bottom wall segments 81 and 83 are opened. Upon discharge of a spring 13 from the storage chamber 61, the transverse portions 21 of the end loops 23 engage the jaws 163 and the cylinders 170 are actuated to tightly clamp the end loops 23 by the jaws 163 and 173. Thereafter, the jaws 163 and 173 in the electrical circuit 172 are suitably electrically energized to heat the clamped spring 13 to effect the desired tempering. Upon completion of the tempering, the movable clamping element 171 is retracted and the clamps 153 and 157 are simultaneously displaced to the retracted positions, thereby permitting the tempered spring to fall onto the stacking blades or guide elements 101 and 113.

Various of the features of the invention are set forth in the following claims.

We claim:

1. Apparatus for stacking loop springs which include a series of oppositely oriented U-shaped loops, said apparatus comprising a frame, a chamber on said frame for temporary and one-at-a-time storage of the springs, means on said frame for guiding and supporting springs into an aligned stack, said spring guiding and supporting means being located below said chamber and having spring guiding and supporting surfaces extending transversely downwardly and outwardly with respect to said chamber, and means on said frame and operative independently of said guiding and supporting means for effecting spring discharge from said chamber and directly onto said guiding and supporting means.

2. Apparatus in accordance with claim 1 wherein said chamber includes a bottom wall.

3. Apparatus for stacking loop springs which include a series of oppositely oriented U-shaped loops, said apparatus comprising a frame, a storage chamber on said frame for temporary and one-at-a-time storage of the springs and including a bottom wall, means on said frame below said storage chamber for guiding and supporting springs into an aligned stack, said spring guiding and supporting means having spring guiding and supporting surfaces extending transversely downwardly and outwardly with respect to the storage chamber, and means on said frame and operative independently of said guiding and supporting means for effecting spring discharge from said storage chamber and onto said guiding and supporting means, said means for effecting spring discharge including a pair of wall segments which form said bottom wall and which are movable away from each other to afford spring passage therebetween and from said storage chamber.

4. Apparatus in accordance with claim 3 wherein said bottom wall segments respectively rotate in opposite directions about respective and spaced parallel axes.

5. Apparatus in accordance with claim 1 wherein the loops have respective closed bite portions and are alternately open in opposite directions, and wherein said guiding and supporting means comprises a pair of guide elements extending vertically in spaced parallel relation and respectively having upper end portions located to engage the closed bite portions of the loops which are open in one direction.

6. Apparatus in accordance with claim 5 wherein the spring loops are alternately open to the front and to the rear, wherein said frame has a front and a rear and wherein said upper end portions of said guide elements extend forwardly from a location rearwardly of the closed bite portions of the rearwardly opening loops of the spring in the spring storage chamber.

7. Apparatus in accordance with claim 1 wherein the spring has opposed ends, wherein the loops have closed bite portions, and wherein said guiding and supporting means includes a first pair of guide and supporting means includes a first pair of guide elements extending vertically in spaced parallel relation to each other and having respective lower end portions extending in one horizontal direction from said storage chamber to support the springs in an aligned stack, and upper end portions located to intercept and engage the closed bite portions of a pair of spaced loops respectively located adjacent the spring ends.

8. Apparatus for stacking loop springs having opposed ends and a series of oppositely oriented U-shaped loops located between the opposed ends and including closed bite portions, said apparatus comprising a frame, means on said frame for temporary and one-at-a-time storage of the springs, means on said frame below said spring storage means for guiding and supporting springs into an aligned stack, said guiding and supporting means including a first pair of guide elements extending vertically in spaced parallel relation to each other and having respective lower end portions extending in one horizontal direction from said storage means to support the springs in an aligned stack, and upper end portions located to intercept and engage the closed bite portions of a pair of spaced loops respectively located adjacent the spring ends, said guiding and supporting means also including a second pair of guide elements extending vertically in spaced parallel relation to each other and in parallel relation to said first pair of guide elements, said second pair of guide elements having lower end portions located below said lower end portions of said first pair of guide elements and extending horizontally in one direction away from said storage means to support the springs in a second aligned stack, and upper end portions located to intercept and engage the closed bite portions of a pair of spaced spring loops located adjacent the spring ends and to guide the springs to the lower end portions of said guide elements of said second pair, and means on said frame and operative independently of said guiding and supporting means for effecting spring discharge from said storage means and onto said guiding and supporting means.

9. Apparatus in accordance with claim 1 wherein said storage chamber includes therein stop means, and means for adjustably locating said stop means lengthwise of said storage chamber.

10. Apparatus in accordance with claim 1 and further including a guide rod supported by said frame and movable between a retracted position clear of said storage chamber and an extended position extending vertically from said storage chamber to adjacent said guiding and supporting means.

11. Apparatus in accordance with claim 10 and further including means for adjustably locating said guide rod lengthwise of said storage chamber.

12. Apparatus for stacking loop springs which include a series of oppositely oriented U-shaped loops, said apparatus comprising a frame, a chamber on said frame for temporary and one-at-a-time storage of the springs, means on said frame for guiding and supporting springs into an aligned stack, said spring guiding and supporting means being located below said chamber and having spring guiding and supporting surfaces extending transversely downwardly and outwardly with respect to said chamber, means on said frame and operative independently of said guiding and supporting means for effecting spring discharge from said chamber and onto said guiding and supporting means and further including means on said frame for tempering the springs incident to spring passage from said storage chamber to said guiding and supporting means.

13. Apparatus for stacking loop springs which include opposed ends and a series of oppositely oriented U-shaped loops between the opposed ends, said apparatus comprising a frame, means on said frame for temporary and one-at-a-time storage of the springs, means on said frame below said spring storage means for guiding and supporting springs into an aligned stack, means on said frame and operative independently of said guiding and supporting means for effecting spring discharge from said storage means and onto said guiding and supporting means, and means on said frame for tempering the springs incident to spring passage from said storage means to said guiding and supporting means, said spring tempering means including a pair of spaced clamps mounted on said frame for movement between retracted positions affording spring movement thereby and extended positions located in the path of travel of the spring ends.

14. Apparatus in accordance with claim 13 wherein the spring ends respectively include transverse portions, wherein each of said clamps includes a first clamping element and a second clamping element movable relative to said first clamping element between a clamping position clamping a transverse spring end portion between said clamping elements and a release position affording spring movement from said clamping elements.

15. Apparatus in accordance with claim 14 wherein one of said first and second clamping elements includes a metallic jaw engageable with the spring transverse end portion and connectable to a source of electrical current.

16. Apparatus for stacking loop springs including opposed ends and a series of oppositely oriented U-shaped loops which have respective closed bite portions and which are alternately open in opposite directions, said apparatus comprising a frame, an elongated storage chamber on said frame for temporary and one-at-a-time storage of the springs, said storage chamber including stop means, and means for adjustably locating said stop means lengthwise of said storage chamber, said storage chamber also including a bottom wall including a pair of segments which are movable away from each other to afford spring passage therebetween and from said storage chamber, a first pair of guide elements supported by said frame and extending vertically in spaced parallel relation to each other and having respective lower end portions extending in one horizontal direction from said storage chamber to support an aligned stack of springs, and upper end portions located below said storage chamber in position to intercept and engage the closed bite portions of a pair of spaced loops respectively located adjacent the spring ends, means on said frame and operative independently of said guiding and supporting means for effecting spring discharge from said storage chamber and onto said guiding and supporting means, and means on said frame for tempering the springs incident to spring passage from said storage chamber to said guiding and supporting means.

17. Apparatus in accordance with claim 16 wherein said bottom wall segments respectively rotate in opposite directions about respective and spaced parallel axes.

18. Apparatus in accordance with claim 16 wherein the spring looPs are alternately open to the front and to the rear, wherein said frame has a front and a rear, and wherein said upper end portions of said guide elements extend forwardly from a location rearwardly of the closed bite portions of the rearwardly open loops of the spring in the spring storage chamber.

19. Apparatus in accordance with claim 16 wherein said guiding and supporting means also includes a second pair of guide elements extending vertically in spaced parallel relation to each other and in parallel relation to said first pair of guide elements, said second pair of guide elements having lower end portions located below said lower end portions of said first pair of guide elements and extending horizontally in said one direction away from said storage chamber to support a second aligned stack of springs, and upPer end portions located to intercept and engage the closed bite portions of a pair of spaced spring loops located adjacent the spring ends and to guide the springs to the lower end portions of said guide elements of said second pair.

20. Apparatus in accordance with claim 16 wherein said spring tempering means includes a pair of spaced clamps mounted on said frame for movement between retracted positions affording spring movement thereby and extended positions located in the path of travel of the spring ends.

21. Apparatus in accordance with claim 20 wherein the spring ends include transverse portions, and wherein each of said clamps includes a first clamping element and a second clamping element movable relative to said first clamping element between a clamping position clamping a transverse spring end portion between said clamping elements and a release position affording spring movement from said clamping elements.

22. Apparatus in accordance with claim 20 wherein one of said first and second clamping elements includes a metallic jaw engageable with the adjacent spring transverse end portion and connectable to a source of electrical current.

* * * * *